(12) United States Patent
Bean

(10) Patent No.: US 12,131,532 B2
(45) Date of Patent: Oct. 29, 2024

(54) TRUSTED IMAGE RECOGNITION SYSTEM

(71) Applicant: Rockwell Collins, Inc., Cedar Rapids, IA (US)

(72) Inventor: Reginald D. Bean, Center Point, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 481 days.

(21) Appl. No.: 17/571,683

(22) Filed: Jan. 10, 2022

(65) Prior Publication Data

US 2023/0222787 A1 Jul. 13, 2023

(51) Int. Cl.
*G06V 20/10* (2022.01)
*H04L 9/08* (2006.01)

(52) U.S. Cl.
CPC .......... *G06V 20/176* (2022.01); *H04L 9/0861* (2013.01)

(58) Field of Classification Search
None
See application file for complete search history.

(56) References Cited

U.S. PATENT DOCUMENTS

| 8,850,198 | B2 | 9/2014 | Hafenscher |
| 9,842,263 | B2 | 12/2017 | Kim et al. |
| 2014/0301550 | A1* | 10/2014 | Lewis ............... H04L 9/0822 380/259 |
| 2015/0270954 | A1* | 9/2015 | Gross ............... H04L 9/0618 380/28 |
| 2016/0105403 | A1* | 4/2016 | Giladi ............... A61K 47/40 713/168 |
| 2019/0236745 | A1 | 8/2019 | Kulkarni et al. |
| 2021/0288815 | A1 | 9/2021 | Murialdo et al. |
| 2022/0191006 | A1* | 6/2022 | Zeh ........................ H04W 4/40 |

FOREIGN PATENT DOCUMENTS

| CN | 104363586 B | * 11/2017 | ............ H04W 12/06 |
| CN | 107426075 A | * 12/2017 | ........... H04L 1/0006 |
| CN | 112311532 B | 8/2021 | |
| CN | 115499124 A | * 12/2022 | ......... H04L 63/0428 |
| KR | 20210019879 A | * 2/2021 | |
| WO | 2020159682 A3 | 9/2020 | |

* cited by examiner

*Primary Examiner* — Jiangeng Sun
(74) *Attorney, Agent, or Firm* — Suiter Swantz IP

(57) ABSTRACT

A trusted image recognition system and method are disclosed. A target vehicle includes a target vehicle controller configured to generate a first cryptographic key having a first sequence of bits, and a mechanical key display device configured to display a mechanical representation of the first sequence of bits. A host vehicle includes an image sensor configured to capture an image of the mechanical representation of the first sequence of bits, and a host vehicle controller configured to: recognize the mechanical representation of the first sequence of bits in the image; retrieve the first sequence of bits of the first cryptographic key from the image; generate a second cryptographic key having a second sequence of bits; compare the first sequence of bits to the second sequence of bits; and, responsive to the first sequence of bits matching the second sequence of bits, identify the target vehicle as an authenticated target vehicle.

11 Claims, 2 Drawing Sheets

TRUSTED IMAGE RECOGNITION SYSTEM

BACKGROUND

As more and more systems become autonomous, there is a growing reliance on image recognition technologies to steer and perform decisions specific to the autonomous system. In some cases, a need may arise to differentiate between objects that appear identical to an image recognition system (for example, objects such as mass produced autonomous vehicles). In addition, this differentiation may need to be trusted to the extent that duplication of the image is improbable (to avoid the object in the duplicate image being recognized as the original).

SUMMARY

A trusted image recognition system is disclosed in accordance with one or more illustrative embodiments of the present disclosure. In one illustrative embodiment, the system comprises a target vehicle including: a target vehicle controller including one or more processors configured to execute program instructions causing the one or more processors to: generate a first cryptographic key having a first sequence of bits; and a mechanical key display device configured to display a mechanical representation of the first sequence of bits. In another illustrative embodiment, the system comprises a host vehicle including: an image sensor configured to capture an image of the mechanical representation of the first sequence of bits displayed by the mechanical key display device of the target vehicle; and a host vehicle controller including one or more processors configured to execute program instructions causing the one or more processors to: recognize the mechanical representation of the first sequence of bits in the image, and, based on the recognition, retrieve the first sequence of bits of the first cryptographic key; generate a second cryptographic key having a second sequence of bits; compare the first sequence of bits of the first cryptographic key to the second sequence of bits of the second cryptographic key; and responsive to the first sequence of bits matching or being identical to the second sequence of bits, identify the target vehicle as an authenticated target vehicle.

A trusted image recognition method is disclosed in accordance with one or more illustrative embodiments of the present disclosure. In one illustrative embodiment, the method comprises, using a target vehicle controller on a target vehicle, generating a first cryptographic key having a first sequence of bits; using a mechanical key display device on the target vehicle, displaying a mechanical representation of the first sequence of bits; using an image sensor on a host vehicle, capturing an image of the mechanical representation of the first sequence of bits displayed by the mechanical key display device of the target vehicle; using a host vehicle controller on the host vehicle, recognizing the mechanical representation of the first sequence of bits in the image, and, based on the recognition, retrieving the first cryptographic key having the first sequence of bits; generating a second cryptographic key having a second sequence of bits; comparing the first sequence of bits of the first cryptographic key to the second sequence of bits of the second cryptographic key; and responsive to the first sequence of bits matching or being identical to the second sequence of bits, identifying the target vehicle as an authenticated target vehicle.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
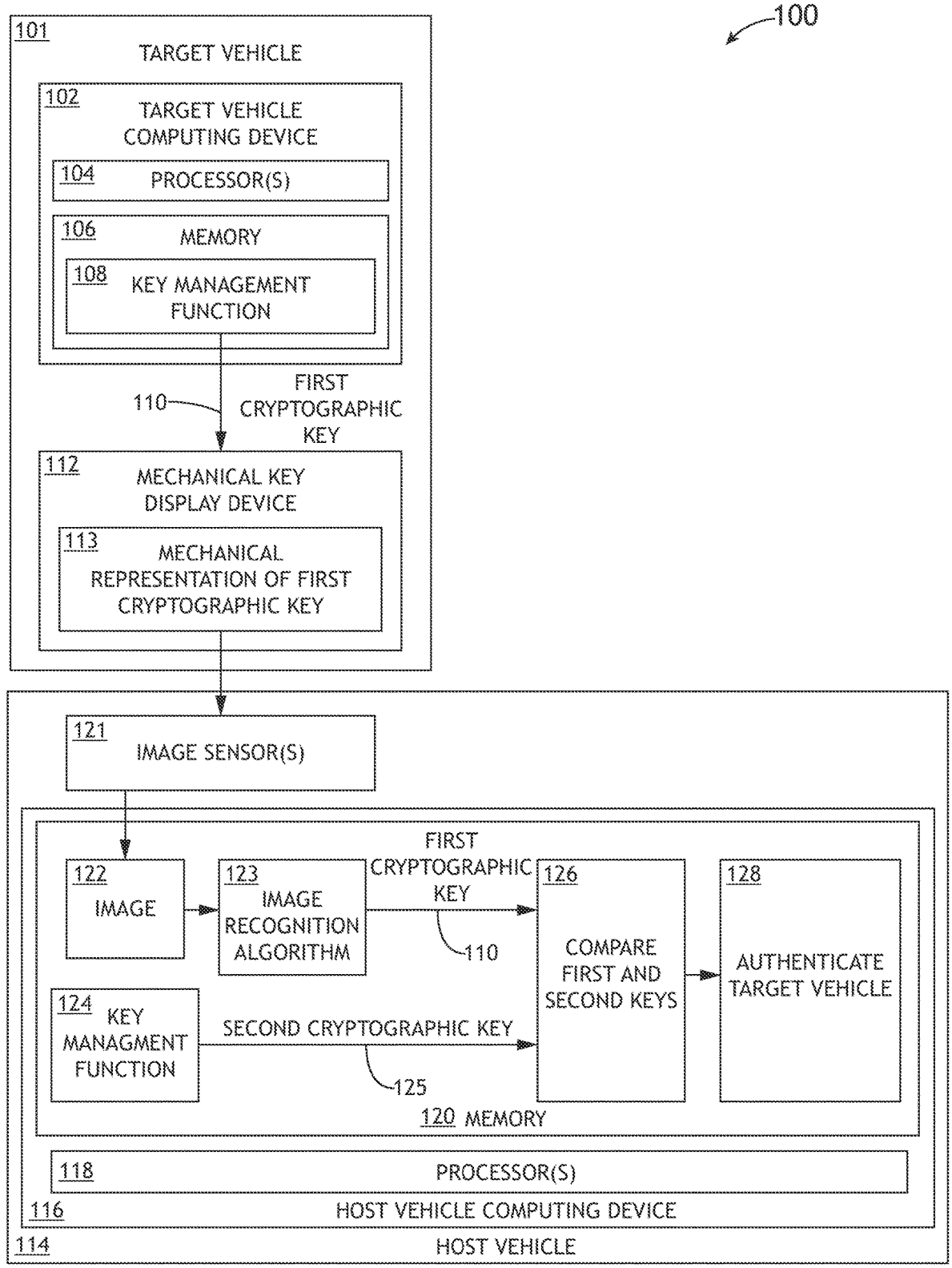
FIG. 1 is a schematic diagram illustrating a trusted image recognition system, in accordance with one or more embodiments of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Autonomous systems, such as unmanned aerial vehicles (UAVs), employ IFF (identify friend-or-foe) systems to identify other vehicles (e.g., other UAVs or manned vehicles). IFF systems enable military and civilian air traffic control interrogation systems to identify aircraft, vehicles, or forces as friendly and to determine their bearing and range from the interrogator.

With a typical IFF system, a transponder on a target vehicle listens for an interrogation signal from the host vehicle. The target vehicle transponder then sends a response that identifies the target vehicle (as an authentic vehicle and therefore not a clone or adversary vehicle). IFF systems conventionally employ radio or infrared frequencies over a secure channel. IFF can only positively identify friendly aircraft or other forces. Typically, if an IFF interrogation receives no reply or an invalid reply, the object is not positively identified as foe.

A problem arises when an IFF radio system malfunctions on either the host vehicle or target vehicle. If the transponder on either vehicle stops working, then radio silence may be observed, and neither vehicle may be able to identify the other. Other problems including the jamming of radio frequencies used to transmit the IFF signal, or the spoofing of the IFF signal (e.g., where the IFF signal is faked by an adversary). To solve the problems described above, a secure system that recognizes and authenticates a target vehicle is desirable.

Embodiments of the present disclosure are directed to a trusted image recognition system and method. The present system and method enable a host vehicle to recognize and authenticate a target vehicle. The target vehicle is authenticated in a way that prevents an adversary vehicle (for example, a duplicate or clone vehicle produced by an adversary or foe that copies the design of a friendly vehicle) from being recognized as a friendly vehicle.

A first cryptographic key (for example, a cryptographic hash) may be generated using a computing device of a target vehicle. A mechanical key display device on the target vehicle may display the sequence of bits of the first cryptographic key mechanically (for example, using an array of LEDs, heating elements, or mechanically flipped black and white indicators).

An image sensor on the host vehicle may capture an image of the mechanical key display device. A computing device of the host vehicle may recognize the sequence of bits of the first cryptographic key in the image (e.g., and store the digital sequence of bits on a memory).

The computing device of the host vehicle may generate a second cryptographic key that is identical to the first cryptographic key. If the first cryptographic key and the second cryptographic key match, then the host vehicle computing device may authenticate the target vehicle. In this way, the target vehicle is identified as a friendly vehicle. If the first cryptographic key and the second cryptographic key do not match, the target vehicle may be identified as an unauthenticated vehicle.

In some embodiments the cryptographic keys may be generated by hashing. For example, the keys may be generated using a secret seed value and a hash function (where the secret seed value is based on a system time). The hash function may be, for example, SHA-224, SHA-256, SHA-384, SHA-512, MD5, MD6, etc. The hash value generated by the hash function may be truncated (for example, from 128 bits to 16 bits).

In some embodiments, the hash function may be used in a hash chain to generate many cryptographic key values based on a shared seed value. At predetermined time increments, the computing device of the host vehicle may iterate its cryptographic key to the next key in the hash chain sequence. Likewise, the computing device of the target vehicle may also iterate its cryptographic key to the next key in the hash chain sequence and update its mechanical key display device. The host vehicle may then authenticate the target vehicle based on the synchronicity of the host cryptographic keys and the display of the target cryptographic keys.

In some embodiments, the first cryptographic key may be transmitted from the host vehicle to the target vehicle using a secure radio channel, and the target vehicle may then display the first cryptographic key on the mechanical key display device. The host vehicle may then capture an image of the mechanical representation of the first cryptographic key.

In some embodiments, the host vehicle and the target vehicle may exchange a challenge and a response. The host vehicle may transmit a challenge to the target vehicle using a secure radio channel. After the challenge is received by the target vehicle, the target vehicle may respond by displaying the first cryptographic key on the mechanical key display device, and the host vehicle may capture and image of the mechanical representation of the first cryptographic key.

In some embodiments, the present system may utilize encryption to derive an image for the host to recognize. In some embodiments, the encryption is symmetrical (for example, Advanced Encryption Standard [AES]) or asymmetrical (for example, Rivest Shamir Adleman [RSA], Diffie-Hellman exchange, etc.).

In one example, a seed value may be encrypted to generate a ciphertext using a private key via a computing device on the host vehicle. The ciphertext may be transmitted using a secure radio channel to the target vehicle. The target vehicle may decrypt the ciphertext to retrieve the seed value using a previously loaded instance of the public key of host vehicle. The target vehicle's decrypted instance of the seed value may be displayed on the mechanical key display device of the target vehicle, and an image sensor on the host vehicle may capture an image of the mechanical key display device. A computing device of the host vehicle may recognize the sequence of bits of the seed value in the image (e.g., store the digital sequence of bits in memory). The seed value may then be authenticated on the host vehicle and thus the target vehicle may be authenticated.

FIG. 1 is a schematic diagram illustrating a trusted image recognition system 100, in accordance with one or more embodiments of the present disclosure.

The system 100 comprises a target vehicle 101 and a host vehicle 114. The target vehicle 101 includes a target vehicle controller 102 (i.e., computer or computing device) including one or more processors 104 and a memory 106, and a mechanical key display device 112. The host vehicle 114 includes a host vehicle controller 116 (i.e., computer or computing device) including one or more processors 118 and a memory 120, and one or more image sensor(s) 121.

The target vehicle 101 and host vehicle 114 may be autonomous vehicles (for example, UAVs or drones). In some embodiments, the target vehicle 101 and host vehicle 114 are manned vehicles. In some embodiments, the target vehicle 101 and the host vehicle 114 are the same type of vehicle. For example, the target vehicle 101 and the host vehicle 114 may each be a unit of a fleet of autonomous vehicles or a swarm of drones.

In some embodiments, the target vehicle 101 and host vehicle 114 are aircraft, for example, a fixed wing, rotary, civilian, commercial, or military aircraft. The aircraft may be jet engine-based or propeller engine-based and may be capable of flying at an altitude of from 0 to over 50,000 feet. For example, the aircraft may be a turboprop aircraft, a piston aircraft, a jet aircraft, a light jet aircraft, a mid-size jet aircraft, a jumbo jet aircraft, a regional jet aircraft, a narrow body aircraft, a wide body airliner air, a regional aircraft, a short-haul aircraft, a commuter liner aircraft, a fighter aircraft, a bomber aircraft, a water bomber aircraft, a multi-role combat aircraft, a maritime patrol aircraft, and/or a transport aircraft.

In some embodiments, the target vehicle 101 and host vehicle 114 are ground-based vehicles (e.g., car, truck, train, transport vehicle, auxiliary vehicle, tank, etc.) or marine-based vehicles (e.g., boat, ship, hovercraft, submarine, etc.). In some embodiments, the target vehicle 101 is a ground-based vehicle and the host vehicle 114 is an aircraft, or vice versa. In some embodiments, the target vehicle 101 and the host vehicle 114 are both ground-based vehicles, both marine-based vehicles, or both aircraft. The target vehicle 101 and host vehicle 114 may be any combination of ground-based vehicles, marine-based vehicles, or aircraft.

For the purposes of the present disclosure, the term "processor" or "processing element" may be broadly defined to encompass any device having one or more processing or logic elements, for example, one or more central processing units (CPUs), one or more graphics processing units (GPUs), one or more micro-processor devices, one or more application specific integrated circuit (ASIC) devices, one or more field programmable gate arrays (FPGAs), or one or more digital signal processors (DSPs), etc. In this sense, the one or more processors 104, 118 may include any device configured to execute algorithms and/or instructions (e.g., program instructions stored in memory 106, 120), and may be configured to perform the method steps described in the present disclosure (for example, the method steps described with respect to FIG. 2). The memory 106, 120 may include any storage medium known in the art suitable for storing program instructions executable by the associated processors 104, 118. For example, the memory 106, 120 may include, but is not limited to, a read-only memory (ROM), a random-access memory (RAM), a magnetic or optical memory device (e.g., hard disk), a magnetic tape, a solid-state drive, and the like.

A key management module 108 may be stored on the memory 108 of the target vehicle controller 102 and a key management module 124 may be stored on the memory 120 of the host vehicle controller 116. The key management module 108 of the target vehicle 101 may be substantially similar or substantially identical to the key management module 124 of the host vehicle 114.

Both key management modules 108, 124 may have access to the same secret seed value, and both modules 108, 124 may be configured to generate a hash value by inputting the seed value into a cryptographic hash function (CHF). The hash value may be a sequence of bits. For example, the hash value may be 64 bits, 128 bits, 256 bits, etc).

The hash value may be used as a cryptographic key. For example, the key management function 108 may generate a first cryptographic key 110 and the key management function 124 may generate a second cryptographic key 125. The first sequence of bits of the first key 110 and the second sequence of bits of the second key 125 may be identical since they are mapped from the same seed value using the same hash function.

The hash function maps the seed value to the hash value in one direction (so that inverting or reversing the computation is infeasible). To find the seed value that produces the hash value (i.e., the sequence of bits of the key 110 or the key 125), the possible inputs must be brute-force searched. The hash function may be, for example, SHA-224, SHA-256, SHA-384, SHA-512, MD5, MD6, etc.

The seed value may be a system time of either the target vehicle controller 102 or the host vehicle controller 116. For example, the system time of the target vehicle controller 102 may be stored on the memory 106 of the target vehicle controller 102 and the system time of the host vehicle controller 116 may be stored on the memory 120 of the host vehicle controller 116. In some embodiments, the system time of the target vehicle controller 102 and the system time of the host vehicle controller 116 may be synchronized to each other (or to an atomic clock). In some embodiments, the seed value may be a system time retrieved from an external server (for example, via a secure internet connection) or other external source (for example, via a secure radio channel from a satellite system).

In some embodiments, the seed value changes periodically (for example, every 10 seconds, every minute, every 10 minutes, every hour, etc.). For example, the seed value may change periodically as the system time changes periodically. A shorter periodic update cycle of the seed value may increase the security of the system 100.

It is noted herein that the seed value may be based on a different parameter other than a system time. For example, the seed value may be a predetermined value generated by an external server and transmitted to both the target vehicle controller 102 and the host vehicle controller 116. The predetermined value may be transmitted to the target vehicle controller 102 and the host vehicle controller 116 via a secure radio link (e.g., a secure internet connection).

In some embodiments, the seed value may be derived from a cryptographic operation that involves a prearranged key and an agreed-upon input to the cryptographic operation such as universal time or geographical coordinates.

In some embodiments, the seed value may be derived from a challenge or challenge/response pair utilizing any number of transmission mechanisms not limited to audio, radio, optical, electromagnetic, acoustic, etc.

The mechanical key display device 112 may be configured to display the values of the first cryptographic key 110 using a mechanical representation 113 of the first cryptographic key 110. The mechanical key display device 112 may comprise a plurality of physical elements that change appearance periodically (for example, with each update cycle of the seed value). Each of the physical elements may represent a single bit (two possible values, e.g., "on" or "off", "0" or "1", "+" or "−", "YES" or "NO"). In some embodiments, each of the physical elements may represent two bits or more (for example, four different colors may represent two bits).

It is noted herein that the term "mechanical key display device" may be construed as interchangeable with the terms "physical key display device," "optical key display device," and "thermal key display device." Additionally, the term "mechanical representation" may be construed as interchangeable with the terms "physical representation," "optical representation," and "thermal representation."

In some embodiments, the mechanical key display device 112 comprises an array of light emitting diodes (LEDs). The LEDs may be any semiconductor light source that emits light in response to current flowing in the semiconductor. The LEDs may emit ultraviolet (UV), visible, or infrared (IR) light.

Each LED in the array of LEDs may be configured to have an on state or an off state to represent each corresponding bit of the first sequence of bits of the cryptographic key 110. To represent a zero bit, the corresponding LED may be in an off state and may not emit any light. To represent a one bit, the corresponding LED may be in an on state and may emit light (or vice versa). For example, to represent 8 bits in the sequence "00001111", four LEDs may be in an off state (representing the four zero bits) and four LEDs may be in an on state (representing the four one bits).

In some embodiments, the mechanical key display device 112 comprises an array of heating elements. The heating elements may convert electrical energy into heat. Electric current may pass through each heating element and encounter resistance, resulting in heating of the heating element. Each of the heating elements may comprise a metal, ceramic, semiconductor, thick-film, composite, etc. material, and may each of the heating elements may be a film, a strip, a panel, a rod, etc.

Each heating element in the array of heating elements may be configured to have an on state or an off state to represent each corresponding bit of the first sequence of bits of the cryptographic key 110. To represent a zero bit, the corresponding heating element may be in an off state and may not emit heat. To represent a one bit, the corresponding heating element may be in an on state and may emit heat (or vice versa).

In some embodiments, the mechanical key display device 112 comprises an array of surfaces. The surfaces may comprise, for example, metallic, plastic, or ceramic structures. Each surface may include a white-colored swath and a black-colored swath and may flip between the white-colored swath and the black-colored swath the represent each bit (in other words, the surfaces may act as mechanical flippers that flip between two values).

Each surface in the array of surfaces may be configured to have an on state or an off state to represent each corresponding bit of the first sequence of bits of the cryptographic key 110. To represent a zero bit, the corresponding surface may display the white-colored swath (e.g., the black-colored swath may be hidden behind a cover). To represent a one bit, the corresponding surface may display the black-colored swath (e.g., by revealing the black swath). Each surface may be configured to display the white swath or the black swath using, for example, a sliding mechanism or a rolling mechanism.

In some embodiments, the hash value generated by the hash function may be truncated (for example, from 128 bits to 16 bits). This truncation of the length of the cryptographic key 110 may in turn reduce the size of the mechanical display device 112 (since less bits are required to represent the key 110, less physical elements are required for the mechanical representation 113).

The one or more image sensors 121 of the host vehicle 114 may comprise UV, optical, or IR based image sensors (i.e., cameras). The image sensor(s) 121 may be charge-coupled devices (CCDs), active-pixel sensors, CMOS sensors, etc. The image sensor(s) 121 may be configured to capture an image 122 (i.e., generate an image) of the mechanical representation 113 of the mechanical key device 112 on the target vehicle 101. The image 122 may then be stored on the memory 120 of the host vehicle 114. In this way, the sequence of bits of the first cryptographic key 110 may be embedded in the image 122 that is captured by the image sensor(s) 121, and the first cryptographic key 110 may be transmitted from the target vehicle 101 to the host vehicle 114.

An image recognition module 123 may be stored on the memory 120 of the host vehicle controller 116. The image recognition module 123 may be configured to detect (i.e., retrieve) the first sequence of bits of the first cryptographic key 110 by recognizing patterns in the image 122. In particular, the module 123 may recognize a sequence of the physical elements of the mechanical representation 113 displayed by the mechanical key display device 112 in the image 122, and translate the sequence of physical elements captured in the image 122 to the first sequence of bits of the first cryptographic key 110. In other words, the module 123 may retrieve or recover the first sequence of bits of the key 110 from the image 122.

For example, if the image sensor(s) 121 comprise infrared (heat-detecting) image sensors and the mechanical representation 113 comprises an array of heating elements, the module 123 may recognize the heating elements in the image 122 and the on state or off state of each heating element. For example, the heating elements in the on state may have a red color in the image 122, and the heating elements in the off state may have a blue color in the image 122. The sequence of adjacent heating elements (for example, "on state, on state, off state, on state") recognized using the module 123 may be translated to the first sequence of bits of the first cryptographic key 110 (for example, "1101"). In other words, the sequence of bits of the first cryptographic key 110 may be retrieved or recovered from the image 122 of the mechanical representation 113 of the mechanical key display device 112.

A comparison module 126 stored on the memory 120 may be configured to compare the first sequence of bits of the first cryptographic key 110 to the second sequence of bits of the second cryptographic key 125.

In response to the first sequence of bits of the first key 110 matching or being identical to the second sequence of bits of the second key 125, an authentication module 128 stored on the memory 120 may be configured to identify the target vehicle 101 as an authenticated vehicle (a friendly vehicle).

In response to the first sequence of bits of the first key 110 not matching or not being identical to the second sequence of bits of the second key 125, the authentication module 128 may be configured to identify the target vehicle 101 as an unauthenticated vehicle (a neutral vehicle or a foe vehicle). The identification of the target vehicle 101 as authorized or unauthorized may be stored in a database on the memory 120.

Figure 2:
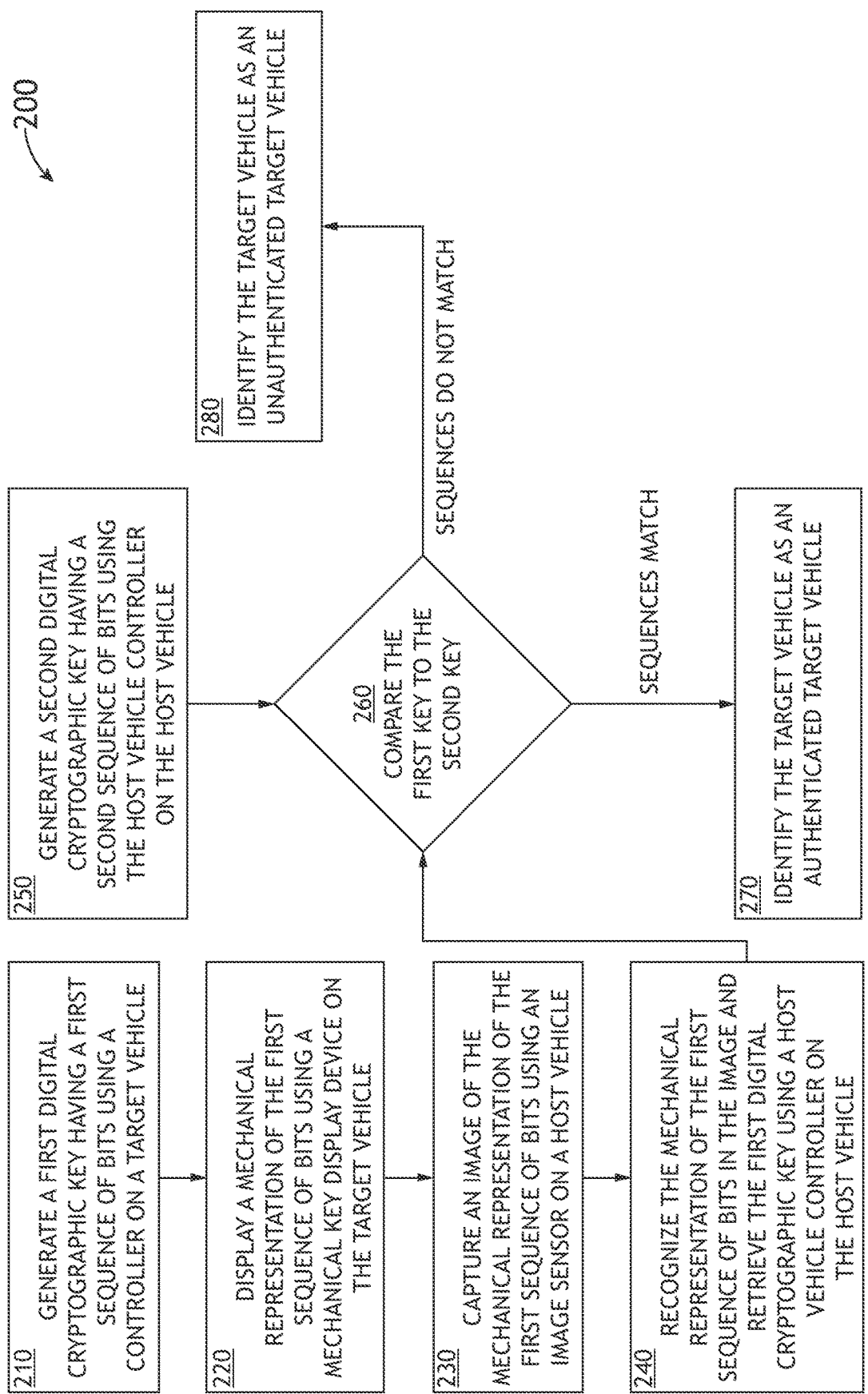
FIG. 2 is a flow chart illustrating a trusted image recognition method, in accordance with one or more embodiments of the present disclosure.

FIG. 2 is a flow chart illustrating a trusted image recognition method 200, in accordance with one or more embodiments of the present disclosure. The trusted image recognition method 200 may be performed using the trusted image recognition system 100 described with respect to FIG. 1.

At step 210, a first cryptographic key having a first sequence of bits is generated using a target vehicle controller on a target vehicle.

At step 220, a mechanical representation of the first sequence of bits is displayed using a mechanical key display device on the target vehicle.

At step 230, an image of the mechanical representation of the first sequence of bits displayed by the mechanical key display device of the target vehicle is captured using an image sensor on a host vehicle.

At step 240, the mechanical representation of the first sequence of bits in the image is recognized using a host vehicle controller on the host vehicle. The first cryptographic key having the first sequence of bits may be retrieved based on the recognition.

At step 250, a second cryptographic key having a second sequence of bits may be generated using the host vehicle controller on the host vehicle. The first sequence of bits and the second sequence of bits may be identical, and may be generated using the same secret seed value and hash function.

At step 260, the first sequence of bits of the first cryptographic key is compared to the second sequence of bits of the second cryptographic key using the host vehicle controller on the host vehicle.

At step 270, in response to the first sequence of bits matching or being identical to the second sequence of bits, the target vehicle may be identified as an authenticated target vehicle.

Otherwise, at step 280, in response to the first sequence of bits not matching or not being identical to the second sequence of bits, the target vehicle may be identified as an unauthenticated target vehicle.

Using a short periodic cycle for updating the seed value (and thus a short periodic cycle for updating the displayed cryptographic key), the present system and method are able to uniquely identify a target with a very low probability of recognizing a clone or duplicate (manufactured by an adversary). The present system and method achieve this advantage by capturing an image of the mechanical representation of the cryptographic key at the target vehicle, converting the patterns in the image to a digital cryptographic key at the host vehicle, and authenticating the target vehicle based on the cryptographic key retrieved from the image.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A trusted image recognition system, comprising:
 a target vehicle including:
  a target vehicle controller including one or more processors configured to execute program instructions causing the one or more processors to:
   receive a seed value from a host vehicle using a radio channel; and
   generate a first cryptographic key having a first sequence of bits, wherein the first sequence of bits of the first cryptographic key is generated using a first hash function executed by the target vehicle controller, wherein the first hash function maps the seed value to the first sequence of bits in response to receiving the seed value; and
  a mechanical key display device configured to display a mechanical representation of the first sequence of bits; and
 the host vehicle including:
  an image sensor, wherein the image sensor is one of an ultraviolet image sensor, a visible image sensor, or an infrared image sensor, wherein the image sensor is configured to capture an image of the mechanical representation of the first sequence of bits displayed by the mechanical key display device of the target vehicle; and
  a host vehicle controller including one or more processors configured to execute program instructions causing the one or more processors to:
   recognize the mechanical representation of the first sequence of bits in the image, and, based on the recognition, retrieve the first sequence of bits of the first cryptographic key;
   generate a second cryptographic key having a second sequence of bits, wherein the second sequence of bits of the second cryptographic key is generated using a second hash function executed by the host vehicle controller, wherein the second hash function maps the seed value to the second sequence of bits;
   compare the first sequence of bits of the first cryptographic key to the second sequence of bits of the second cryptographic key; and
   responsive to the first sequence of bits matching or being identical to the second sequence of bits, identify the target vehicle as an authenticated target vehicle.

2. The trusted image recognition system of claim 1, wherein the seed value is a system time.

3. The trusted image recognition system of claim 2, wherein the system time changes periodically so that the seed value, the first sequence of bits of the first cryptographic key, and the second sequence of bits of the second cryptographic key change periodically.

4. The trusted image recognition system of claim 1,
 wherein the mechanical key display device comprises an array of LEDs configured to display the mechanical representation of the first sequence of bits,
 wherein each LED in the array of LEDs is configured to have an on state and an off state to represent each corresponding bit of the first sequence of bits.

5. The trusted image recognition system of claim 1,
 wherein the image sensor is the infrared image sensor,
 wherein the mechanical key display device comprises an array of heating elements configured to display the mechanical representation of the first sequence of bits,
 wherein each heating element is configured to have an on state and an off state to represent each corresponding bit of the first sequence of bits.

6. A trusted image recognition method, comprising:
 receiving, by a target vehicle, a seed value from a host vehicle using a radio channel;
 using a target vehicle controller on the target vehicle, generating a first cryptographic key having a first sequence of bits, wherein the first sequence of bits of the first cryptographic key is generated using a first hash function executed by the target vehicle controller, wherein the first hash function maps the seed value to the first sequence of bits in response to receiving the seed value;
 using a mechanical key display device on the target vehicle, displaying a mechanical representation of the first sequence of bits;
 using an image sensor on the host vehicle, capturing an image of the mechanical representation of the first sequence of bits displayed by the mechanical key display device of the target vehicle, wherein the image sensor is one of an ultraviolet image sensor, a visible image sensor, or an infrared image sensor;

using a host vehicle controller on the host vehicle, recognizing the mechanical representation of the first sequence of bits in the image, and, based on the recognition, retrieving the first cryptographic key having the first sequence of bits;

generating a second cryptographic key having a second sequence of bits, wherein the second sequence of bits of the second cryptographic key is generated using a second hash function executed by the host vehicle controller, wherein the second hash function maps the seed value to the second sequence of bits;

comparing the first sequence of bits of the first cryptographic key to the second sequence of bits of the second cryptographic key; and responsive to the first sequence of bits matching or being identical to the second sequence of bits, identifying the target vehicle as an authenticated target vehicle.

7. The trusted image recognition method of claim 6, wherein the seed value is a system time.

8. The trusted image recognition method of claim 7, wherein the system time changes periodically so that the seed value, the first sequence of bits of the first cryptographic key, and the second sequence of bits of the second cryptographic key change periodically.

9. The trusted image recognition method of claim 6,
wherein the mechanical key display device comprises an array of LEDs configured to display the mechanical representation of the first sequence of bits,
wherein each LED in the array of LEDs is configured to have an on state and an off state to represent each corresponding bit of the first sequence of bits.

10. The trusted image recognition method of claim 6,
wherein the image sensor is the infrared image sensor,
wherein the mechanical key display device comprises an array of heating elements configured to display the mechanical representation of the first sequence of bits,
wherein each heating element is configured to have an on state and an off state to represent each corresponding bit of the first sequence of bits.

11. A trusted image recognition system, comprising:
a target vehicle controller on a target vehicle, the target vehicle controller including one or more processors configured to execute program instructions causing the one or more processors to:
receive a seed value from a host vehicle using a radio channel; and
generate a first cryptographic key having a first sequence of bits, wherein the first sequence of bits of the first cryptographic key is generated using a first hash function executed by the target vehicle controller, wherein the first hash function maps the seed value to the first sequence of bits in response to receiving the seed value;
a mechanical key display device on the target vehicle configured to display a mechanical representation of the first sequence of bits, wherein the first sequence of bits is the first cryptographic key generated by the target vehicle controller on the target vehicle;
an image sensor on a host vehicle, wherein the image sensor is one of an ultraviolet image sensor, a visible image sensor, or an infrared image sensor, wherein the image sensor is configured to capture an image of the mechanical representation of the first sequence of bits displayed by the mechanical key display device on the target vehicle,
wherein a host vehicle controller on the host vehicle is configured to:
recognize the mechanical representation of the first sequence of bits in the image, and, based on the recognition, retrieve the first sequence of bits of the first cryptographic key;
generate a second cryptographic key having a second sequence of bits, wherein the second sequence of bits of the second cryptographic key is generated using a second hash function executed by the host vehicle controller, wherein the second hash function maps the seed value to the second sequence of bits;
compare the first sequence of bits of the first cryptographic key to the second sequence of bits of the second cryptographic key; and
responsive to the first sequence of bits matching or being identical to the second sequence of bits, identify the target vehicle as an authenticated target vehicle.

* * * * *